United States Patent
Gao et al.

(10) Patent No.: US 11,438,026 B2
(45) Date of Patent: Sep. 6, 2022

(54) POWER GENERATION SYSTEM AND COMMUNICATIONS APPARATUS USED IN POWER GENERATION SYSTEM

(71) Applicant: Huawei Digital Power Technologies Co., Ltd., Shenzhen (CN)

(72) Inventors: Yongbing Gao, Shanghai (CN); Yanzhong Zhang, Shanghai (CN); Tiansan Lin, Shanghai (CN); Wei Shui, Dongguan (CN); Chen Wang, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/137,915

(22) Filed: Dec. 30, 2020

(65) Prior Publication Data

US 2021/0126671 A1  Apr. 29, 2021

Related U.S. Application Data

(63) Continuation of application No. PCT/CN2020/086426, filed on Apr. 23, 2020.

(30) Foreign Application Priority Data

Aug. 2, 2019 (CN) .......................... 201910712765.0

(51) Int. Cl.
*H04B 3/06* (2006.01)
*H04B 3/54* (2006.01)

(52) U.S. Cl.
CPC ............... *H04B 3/06* (2013.01); *H04B 3/548* (2013.01)

(58) Field of Classification Search
CPC . H04B 3/06; H04B 3/548; H04B 3/04; H04B 3/32; H04B 2203/5445; H04B 2203/5458
See application file for complete search history.

(56) References Cited

U.S. PATENT DOCUMENTS

RE44,975 E  *  7/2014  Saggini ................. H04B 3/548
                                                    307/77
9,634,723 B1 *  4/2017  Lawal ................. H04L 25/0272
(Continued)

FOREIGN PATENT DOCUMENTS

CN          1556623 A      12/2004
CN        103009723 A       4/2013
(Continued)

*Primary Examiner* — Dac V Ha
(74) *Attorney, Agent, or Firm* — Womble Bond Dickinson (US) LLP

(57) ABSTRACT

An inverter in a power generation system converts a direct current that is input from a direct-current-side device into an alternating current for power supply. The inverter includes a control apparatus and a communications apparatus. The control apparatus controls the inverter to convert the direct current that is input from the direct-current-side device into an alternating current for power supply. The communications apparatus is coupled to the control apparatus, and sends a networking information request signal used to request networking information to the direct-current-side device in the power generation system through a direct-current power line, where a frequency of the networking information request signal is within a first frequency band. The communications apparatus also receives the networking information from the direct-current-side device; and sends a control signal to the direct-current-side device, where a frequency of the control signal is within a second frequency band.

30 Claims, 6 Drawing Sheets

(56) References Cited

U.S. PATENT DOCUMENTS

| | | |
|---|---|---|
| 2007/0168396 A1 | 7/2007 | Adams et al. |
| 2010/0117858 A1 | 5/2010 | Rozenboim |
| 2012/0089260 A1* | 4/2012 | Krohne .................. H04B 3/544 |
| | | 700/286 |
| 2014/0003110 A1 | 1/2014 | Rothblum et al. |
| 2014/0268958 A1* | 9/2014 | Chapman .................. H02J 3/46 |
| | | 363/97 |
| 2017/0030950 A1* | 2/2017 | Uebel .................... G01R 22/06 |

FOREIGN PATENT DOCUMENTS

| | | |
|---|---|---|
| CN | 103703647 A | 4/2014 |
| CN | 103986182 A | 8/2014 |
| CN | 104410106 A | 3/2015 |
| CN | 105049085 A | 11/2015 |
| CN | 105897306 A | 8/2016 |
| CN | 106788216 A | 5/2017 |
| CN | 106788591 A | 5/2017 |
| CN | 106849997 A | 6/2017 |
| CN | 110572184 A | 12/2019 |
| WO | 2016057251 A | 4/2016 |

\* cited by examiner

POWER GENERATION SYSTEM AND COMMUNICATIONS APPARATUS USED IN POWER GENERATION SYSTEM

CROSS-REFERENCE TO RELATED APPLICATIONS

This application is a continuation of International Application No. PCT/CN2020/086426, filed on Apr. 23, 2020, which claims priority to Chinese Patent Application No. 201910712765.0, filed on Aug. 2, 2019. The disclosures of the aforementioned applications are hereby incorporated by reference in their entireties.

TECHNICAL FIELD

This application relates to a power generation system and a communications apparatus used in a power generation system.

BACKGROUND

Currently, in a photovoltaic power generation system, an RS485 or controller area network (CAN) communication manner is usually used between an inverter and a direct-current-side device. However, the direct-current-side device such as a power converter is usually far away from the inverter. In this case, if RS485 or CAN communication is used, a long trench needs to be dug or a communication cable needs to be routed overhead additionally during construction. The construction is complex and the communication cable costs much. In addition, if a port of the communication cable is used for a long time, the port may be corroded, the cable may be damaged, or other problems may occur. Consequently, communication quality deteriorates or communication is interrupted, affecting normal running of the system.

SUMMARY

An objective of this application is to provide a solution for communication between an inverter and a direct-current-side device.

A first aspect of this application provides an inverter in a power generation system, where the inverter is configured to convert a direct current that is input from a direct-current-side device into an alternating current for power supply. The inverter may include a control apparatus and a communications apparatus. The control apparatus may be configured to control the inverter to convert the direct current that is input from the direct-current-side device into the alternating current for power supply. The communications apparatus is coupled to the control apparatus, and may be configured to: send a networking information request signal to the direct-current-side device in the power generation system through a direct-current power line that transmits the direct current in the power generation system, where a frequency of the networking information request signal is within a first frequency band, and the networking information request signal may be used to request networking information required for networking between the inverter and the direct-current-side device; receive the networking information from the direct-current-side device through the direct-current power line; and send a control signal to the direct-current-side device through the direct-current power line, where a frequency of the control signal may be within a second frequency band, the control signal is used to control an operating parameter of the direct-current-side device, and the first frequency band may be lower than the second frequency band.

The inverter communicates through the power line that transmits electric energy in the power generation system, uses a low-frequency signal for networking with the direct-current-side device, and then uses a high-frequency signal for high-speed information transmission and control. During networking, a relatively small amount of data is communicated and a delay requirement is relatively low, so that communication at a relatively low frequency can effectively prevent high-frequency crosstalk during the networking between the inverter and the direct-current-side device. During control, communication at a relatively high frequency can quickly transmit a signal with a large amount of data or a relatively high delay requirement. Compared with conventional single-band communication, the solution provided in this application can effectively prevent crosstalk during the networking between the inverter and the direct-current-side device, and ensure a speed of subsequent communication.

In an embodiment, the networking information may include at least one of a physical address, a logical address, a serial number, and a device identification code of the direct-current-side device. A frequency of the received networking information may also be within the first frequency band, to prevent crosstalk and ensure smooth networking.

In an embodiment, the communications apparatus may be further configured to receive an operating information transmission signal from the direct-current-side device through the direct-current power line, where the operating information transmission signal may carry at least one of operating status information, an operating log, and alarm information of the direct-current-side device, and a frequency of the received operating information transmission signal may be within the second frequency band. In this way, the direct-current-side device and the inverter can communicate with each other after the networking. During communication, signals sent and received by the two are also within the second frequency band with a relatively high frequency, thereby implementing high-speed information transmission.

In an embodiment, the control signal may include a general control signal and a special control signal, where an amplitude of the special control signal is different from an amplitude of the general control signal, the general control signal is used to control the operating parameter of the direct-current-side device in a normal case, and the special control signal is used to control the operating parameter of the direct-current-side device in a special case, for example, a high voltage ride-through case or a low voltage ride-through case. As controlled in this manner, after detecting that a signal amplitude is abnormal, the direct-current-side device can quickly perform a predetermined action to quickly adjust the operating parameter of the direct-current-side device.

In an embodiment, the direct-current-side device may include, but is not limited to, any one or more of a power converter, an energy storage converter, a battery cabinet, and the like; and the operating parameter may include at least one of an output power, an output voltage, and an output current of the direct-current-side device.

In this application, the direct-current power line that transmits electric energy in the power generation system may be used for communication between the inverter and the direct-current-side device; a relatively low frequency is used for communication during networking, because a low-frequency signal may be transmitted over a longer distance, and is suitable for transmitting a signal that has a relatively small amount of data or that allows a relatively high delay; and a relatively high frequency is used for communication during control, to quickly transmit a signal with a large amount of data or a low delay, thereby effectively preventing crosstalk during the networking between the inverter and the direct-current-side device, and ensuring a speed of subsequent communication.

A second aspect of this application provides a method for an inverter in a power generation system. The method may include: generating a networking information request signal, and sending the networking information request signal to a direct-current-side device in the power generation system through a direct-current power line that is used to transmit electric energy in the power generation system, where a frequency of the networking information request signal may be within a first frequency band, and the networking information request signal may be used to request networking information required for networking between the inverter and the direct-current-side device; receiving the networking information from the direct-current-side device through the direct-current power line, and performing networking with the direct-current-side device based on the networking information; and generating a control signal, and sending the control signal to the direct-current-side device through the direct-current power line, where a frequency of the control signal may be within a second frequency band, the control signal is used to control an operating parameter of the direct-current-side device, and the first frequency band may be lower than the second frequency band.

In this method, the inverter communicates through the power line that transmits electric energy in the power generation system, thereby saving a communication cable; and uses a low-frequency signal for networking with the direct-current-side device, and then uses a high-frequency signal for high-speed information transmission and control, thereby effectively resolving a problem of crosstalk during networking in direct current carrier communication.

In an embodiment, the networking information may include at least one of a physical address, a logical address, a serial number, and a device identification code of the direct-current-side device. A frequency of the received networking information may be within the first frequency band, to prevent crosstalk and ensure smooth networking.

In an embodiment, the method may further include: receiving an operating information transmission signal from the direct-current-side device through the direct-current power line, where the operating information transmission signal may carry at least one of operating status information, an operating log, and alarm information of the direct-current-side device, and a frequency of the received operating information transmission signal may be within the second frequency band. In this way, the direct-current-side device and the inverter can communicate with each other after the networking. During communication, signals sent and received by the two are also within the second frequency band with a relatively high frequency, thereby implementing high-speed information transmission.

In an embodiment, the control signal may include a general control signal and a special control signal, where an amplitude of the special control signal may be different from an amplitude of the general control signal, the general control signal may be used to control the operating parameter of the direct-current-side device in a normal case, and the special control signal may be used to control the operating parameter of the direct-current-side device in a special case, for example, a high voltage ride-through case or a low voltage ride-through case. As controlled in this manner, after detecting that a signal amplitude is abnormal, the direct-current-side device can quickly perform a predetermined action to quickly adjust the operating parameter of the direct-current-side device.

In an embodiment, the direct-current-side device may include, but is not limited to, any one or more of a power converter, an energy storage converter, a battery cabinet, and the like; and the operating parameter includes at least one of an output power, an output voltage, and an output current of the direct-current-side device.

A third aspect of this application provides a direct-current-side device. The direct-current-side device may include a communications apparatus and a control apparatus. The communications apparatus may be configured to: receive a networking information request signal from an inverter in a power generation system through a direct-current power line that transmits electric energy in the power generation system, where a frequency of the networking information request signal may be within a first frequency band, and the networking information request signal may be used to request networking information required for networking between the inverter and the direct-current-side device; send the networking information to the inverter through the direct-current power line; and receive a control signal from the inverter, where a frequency of the control signal may be within a second frequency band, the control signal is used to control an operating parameter of the direct-current-side device, and the first frequency band may be lower than the second frequency band. The control apparatus may be coupled to the communications apparatus, and may be configured to adjust the operating parameter of the direct-current-side device based on the received control signal.

The direct-current-side device receives a signal from the inverter through the direct-current power line, and performs a corresponding adjustment or feedback; and a low-frequency signal is used for networking with the direct-current-side device, and then a high-frequency signal is used for high-speed information transmission and control. Compared with conventional single-band communication, the solution provided in this application can effectively prevent crosstalk during the networking between the inverter and the direct-current-side device, and ensure a speed of subsequent communication.

In an embodiment, the direct-current-side device may include, but is not limited to, any one or more of a power converter, an energy storage converter, a battery cabinet, and the like; and the operating parameter controlled by the control signal may include, but is not limited to, any one or more of an output power, an output voltage, an output current, and the like of the direct-current-side device.

In an embodiment, the networking information may include at least one of a physical address, a logical address, a serial number, and a device identification code of the direct-current-side device. A frequency of the received networking information may also be within the first frequency band, to prevent crosstalk and ensure smooth networking.

In an embodiment, the communications apparatus may be further configured to send an operating information transmission signal to the inverter through the direct-current power line, where the operating information transmission signal may carry at least one of operating status information, an operating log, and alarm information of the direct-current-side device, and a frequency of the operating information transmission signal may be within the second frequency band. In this way, the direct-current-side device and the inverter can communicate with each other after the networking. During communication, signals sent and received by the two are also within the second frequency band with a relatively high frequency, thereby implementing high-speed information transmission.

In an embodiment, the control apparatus may be further configured to control, based on an indication that the direct-current-side device has been networked with the inverter, the direct-current-side device to switch from a power-limited output state with a limited output power to a normal operating state. In the power-limited output state, an output voltage, current, or power or the like of the direct-current-side device is limited, to avoid a problem such as an electric shock or line overload caused by a construction problem such as incorrect cable connection or cable damage or accidental contact, thereby improving safety.

In an embodiment, the control signal may include a general control signal and a special control signal, where an amplitude of the special control signal may be different from an amplitude of the general control signal, the general control signal may be used to control the operating parameter of the direct-current-side device in response to a non-special case, and the special control signal may be used to control the operating parameter of the direct-current-side device in a special case, for example, a high voltage ride-through case or a low voltage ride-through case. In this manner, after detecting that a signal amplitude is abnormal, the direct-current-side device can quickly perform a predetermined action to quickly adjust the operating parameter of the direct-current-side device.

A fourth aspect of this application provides a method for a direct-current-side device in a power generation system. The method may include: receiving a networking information request signal from an inverter through a direct-current power line that is used to transmit electric energy in the power generation system, where a frequency of the networking information request signal may be within a first frequency band, and the networking information request signal may be used to request networking information required for networking between the inverter and the direct-current-side device; sending the networking information to the inverter through the direct-current power line; and receiving a control signal from the inverter, where a frequency of the control signal may be within a second frequency band, the control signal is used to control an operating parameter of the direct-current-side device, and the first frequency band may be lower than the second frequency band.

The direct-current-side device receives a signal from the inverter through the direct-current power line, and performs a corresponding adjustment or feedback; and a low-frequency signal is used for networking with the direct-current-side device, and then a high-frequency signal is used for high-speed information transmission and control. Compared with conventional single-band communication, the solution provided in this application can effectively prevent crosstalk during the networking between the inverter and the direct-current-side device, and ensure a speed of subsequent communication.

In an embodiment, the direct-current-side device may include, but is not limited to, any one or more of a power converter, an energy storage converter, a battery cabinet, and the like; and the operating parameter controlled by the control signal may include, but is not limited to, any one or more of an output power, an output voltage, an output current, and the like of the direct-current-side device.

In an embodiment, the networking information may include at least one of a physical address, a logical address, a serial number, and a device identification code of the direct-current-side device. A frequency of the received networking information may also be within the first frequency band, to prevent crosstalk and ensure smooth networking.

In an embodiment, the method may further include: sending an operating information transmission signal to the inverter through the direct-current power line, where the operating information transmission signal carries at least one of operating status information, an operating log, and alarm information of the direct-current-side device, and a frequency of the operating information transmission signal may be within the second frequency band. In this way, the direct-current-side device and the inverter can communicate with each other after the networking. During communication, signals sent and received by the two are also within the second frequency band with a relatively high frequency, thereby implementing high-speed information transmission.

In an embodiment, the method may further include: controlling, based on the received control signal, the direct-current-side device to switch from a power-limited output state with a limited output power to a normal operating state. In the power-limited output state, an output voltage, current, or power or the like of the direct-current-side device is limited, to avoid a problem such as an electric shock or line overload caused by a construction problem such as incorrect cable connection or cable damage or accidental contact, thereby improving safety.

In an embodiment, the control signal may include a general control signal and a special control signal, where an amplitude of the special control signal may be different from an amplitude of the general control signal, the general control signal may be used to control the operating parameter of the direct-current-side device in response to a non-special case, and the special control signal may be used to control the operating parameter of the direct-current-side device in a special case, for example, a high voltage ride-through case or a low voltage ride-through case. In this manner, after detecting that a signal amplitude is abnormal, the direct-current-side device can quickly perform a predetermined action to quickly adjust the operating parameter of the direct-current-side device.

A fifth aspect of this application provides a power generation system, including a direct-current-side device and an inverter, where the direct-current-side device is connected to and transmits electric energy to the inverter through a direct-current power line. The inverter is configured to generate a networking information request signal, and send the networking information request signal to the direct-current-side device through the direct-current power line, where a frequency of the networking information request signal is within a first frequency band, and the networking information request signal is used to request networking information required for networking between the inverter and the direct-current-side device. The direct-current-side device is configured to send the networking information to the inverter through the direct-current power line based on the received networking information request signal. The inverter is further configured to perform networking with the direct-current-side device based on the received networking information, generate a control signal, and send the control signal to the direct-current-side device through the direct-current power line, where a frequency of the control signal is within a second frequency band, and the control signal is used to control an operating parameter of the direct-current-side device; and the second frequency band is higher than the first frequency band.

In the solution provided in this application, the direct-current power line that transmits electric energy in the power generation system is used for communication between the inverter and the direct-current-side device, a relatively low frequency is used for communication during networking, and a relatively high frequency is used for communication during control. During networking, a relatively small amount of data is communicated and a delay requirement is relatively low, so that communication at a relatively low frequency can effectively prevent high-frequency crosstalk during the networking between the inverter and the direct-current-side device. During control, communication at a relatively high frequency can quickly transmit a signal with a large amount of data or a relatively high delay requirement. Compared with conventional single-band communication, the solution provided in this application can effectively prevent crosstalk during the networking between the inverter and the direct-current-side device, and ensure a speed of subsequent communication.

In an embodiment, the networking information may include at least one of a physical address, a logical address, a serial number, and a device identification code of the direct-current-side device. A frequency of the networking information may also be within the first frequency band, to prevent crosstalk and ensure smooth networking. In addition, the foregoing direct-current-side device may include any one or more of devices such as a power converter, an energy storage converter, and a battery cabinet that are connected to a direct current input end of the inverter through a direct current transmission cable; and the operating parameter may include any one or more of an output power, an output voltage, an output current, and the like of the direct-current-side device.

In an embodiment, the direct-current-side device may be further configured to send an operating information transmission signal to the inverter through the direct-current power line, where the operating information transmission signal may carry at least one of operating status information, an operating log, and alarm information of the direct-current-side device, and a frequency of the operating information transmission signal may be within the second frequency band. After the networking, the direct-current-side device and the inverter transmit data to each other, to implement bidirectional communication. During communication, signals sent and received by the two may also be within the second frequency band with a relatively high frequency, to implement high-speed information transmission.

In an embodiment, the control signal may include a general control signal and a special control signal, where an amplitude of the special control signal is different from an amplitude of the general control signal, the general control signal may be used to control the operating parameter of the direct-current-side device in a normal case, and the special control signal may be used to control the operating parameter of the direct-current-side device in a special case, for example, a high voltage ride-through case or a low voltage ride-through case. In this manner, after detecting that a signal amplitude is abnormal, the direct-current-side device can quickly perform a predetermined action to quickly adjust the operating parameter of the direct-current-side device.

In this application, the direct-current power line that transmits electric energy in the power generation system may be used for communication between the inverter and the direct-current-side device; a relatively low frequency is used for communication during networking, because a low-frequency signal may be transmitted over a longer distance, and is suitable for transmitting a signal that has a relatively small amount of data or that allows a relatively high delay; and a relatively high frequency is used for communication during control, to quickly transmit a signal with a large amount of data or a low delay, thereby effectively preventing crosstalk during the networking between the inverter and the direct-current-side device, and ensuring a speed of subsequent communication.

A sixth aspect of this application provides a machine-readable medium, where the machine-readable medium stores a program, and when the program is run on a computing device, the computing device performs the method provided in the second aspect or any embodiment of the second aspect, or the fourth aspect or any embodiment of the fourth aspect.

A seventh aspect of this application provides a system, including a processor and a memory, where the memory stores an instruction, and the processor is configured to read the instruction stored in the memory, to perform the method provided in the second aspect or any embodiment of the second aspect, or the fourth aspect or any embodiment of the fourth aspect.

An eighth aspect of this application provides a communications apparatus used in a power generation system, where the communications apparatus may include a controller and a transceiver. The transceiver may be configured to send a to-be-sent signal from a transmit end to a receive end through a power line. The controller may be configured to control a frequency of the to-be-sent signal based on information related to the to-be-sent signal, where the information related to the to-be-sent signal may include at least one of the following: information about networking between the transmit end and the receive end of the to-be-sent signal, an amount of data of the to-be-sent signal, a delay of the to-be-sent signal, a distance over which the to-be-sent signal is to be sent, and the like.

The communications apparatus may be installed in the power generation system, and is configured to communicate through the power line in the power generation system. For example, the communications apparatus may be installed at the foregoing direct-current-side device or inverter, to communicate through a direct-current power line. In some cases, the communications apparatus may alternatively be installed in a device that communicates through an alternating-current power line, to couple a signal to the alternating-current power line for communication.

In an embodiment, that the controller is configured to control a frequency of the to-be-sent signal based on information related to the to-be-sent signal may further include being configured to: control the frequency of the to-be-sent signal to be within a first frequency band when the to-be-sent signal is a to-be-sent signal in a case in which the transmit end is not networked with the receive end; and control the frequency of the to-be-sent signal to be within a second frequency band when the to-be-sent signal is a to-be-sent signal in a case in which the transmit end has been networked with the receive end, where the first frequency band may be lower than the second frequency band.

In an embodiment, when the frequency of the to-be-sent signal is within the first frequency band, the to-be-sent signal may include a networking information request signal, where the networking information request signal may be used to request networking information required for networking between an inverter and a direct-current-side device, and the networking information may include at least one of a physical address, a logical address, a serial number, and a device identification code of the direct-current-side device. When the frequency of the to-be-sent signal is within the second frequency band, the to-be-sent signal may include a control signal or an operating information transmission signal, where the control signal may be used to control a parameter of the direct-current-side device, and the operating information transmission signal may carry at least one of operating status information, an operating log, and alarm information of the direct-current-side device.

In an embodiment, the transmit end may be an inverter in the power generation system, the receiving end may be a direct-current-side device in the power generation system, and the power line may be a direct-current power line.

In an embodiment, that the controller is configured to control a frequency of the to-be-sent signal based on information related to the to-be-sent signal may further include being configured to: control, based on a data amount range within which the amount of data of the to-be-sent signal is located, a frequency band within which the frequency of the to-be-sent signal is located, where a smaller data amount range may indicate a lower frequency band. In some cases, a frequency of a to-be-sent signal within a specified data amount range may be limited to a frequency band. In some other cases, a frequency of a to-be-sent signal within a specified data amount range may be limited to a specific frequency.

In an embodiment, that the controller is configured to control a frequency of the to-be-sent signal based on information may further include being configured to: control, based on a delay range within which the signal delay of the to-be-sent signal is located, a frequency band within which the frequency of the to-be-sent signal is located, where a lower delay range may indicate a higher frequency band. In some cases, a frequency of a to-be-sent signal within a specified delay range may be limited to a frequency band. In some other cases, a frequency of a to-be-sent signal within a specified delay range may be limited to a specific frequency.

In an embodiment, that the controller is configured to control a frequency of the to-be-sent signal based on information related to the to-be-sent signal may further include being configured to: control, based on a distance range within which the distance over which the to-be-sent signal is to be sent is located, a frequency band within which the frequency of the to-be-sent signal is located, where a longer distance range may indicate a lower frequency band. In some cases, a frequency of a to-be-sent signal within a specified distance range may be limited to a frequency band. In some other cases, a frequency of a to-be-sent signal within a specified distance range may be limited to a specific frequency.

In an embodiment, the controller may be further configured to: control an amplitude of the to-be-sent signal based on whether at least one of the transmit end and the receive end is in a predetermined case, where if at least one of the transmit end and the receive end is in the predetermined case, the amplitude of the to-be-sent signal may be controlled to be a first amplitude; and if neither is in the predetermined case, the amplitude of the to-be-sent signal may be controlled to be a second amplitude, where the first amplitude is different from the second amplitude, and the predetermined case may include a high-voltage ride through case or a low-voltage ride through case.

According to the foregoing aspects provided in this application, no additional communication cable needs to be disposed for communication between the direct-current-side device and the inverter in the power generation system, but instead, the power line that transmits electric energy is directly used for communication, and different signals are respectively transmitted by using two frequency bands, because a low-frequency signal may be transmitted over a longer distance, and is suitable for transmitting a signal that has a relatively small amount of data or that allows a relatively high delay, while a high-frequency signal is suitable for transmitting a signal with a large amount of data or a low delay. For example, a signal with a relatively low frequency is used during networking, and a signal with a relatively high frequency is used for subsequent information transmission and control. This can effectively prevent crosstalk during the networking between the inverter and the direct-current-side device, while ensuring communication efficiency.

DESCRIPTION OF EMBODIMENTS

Figure 1:
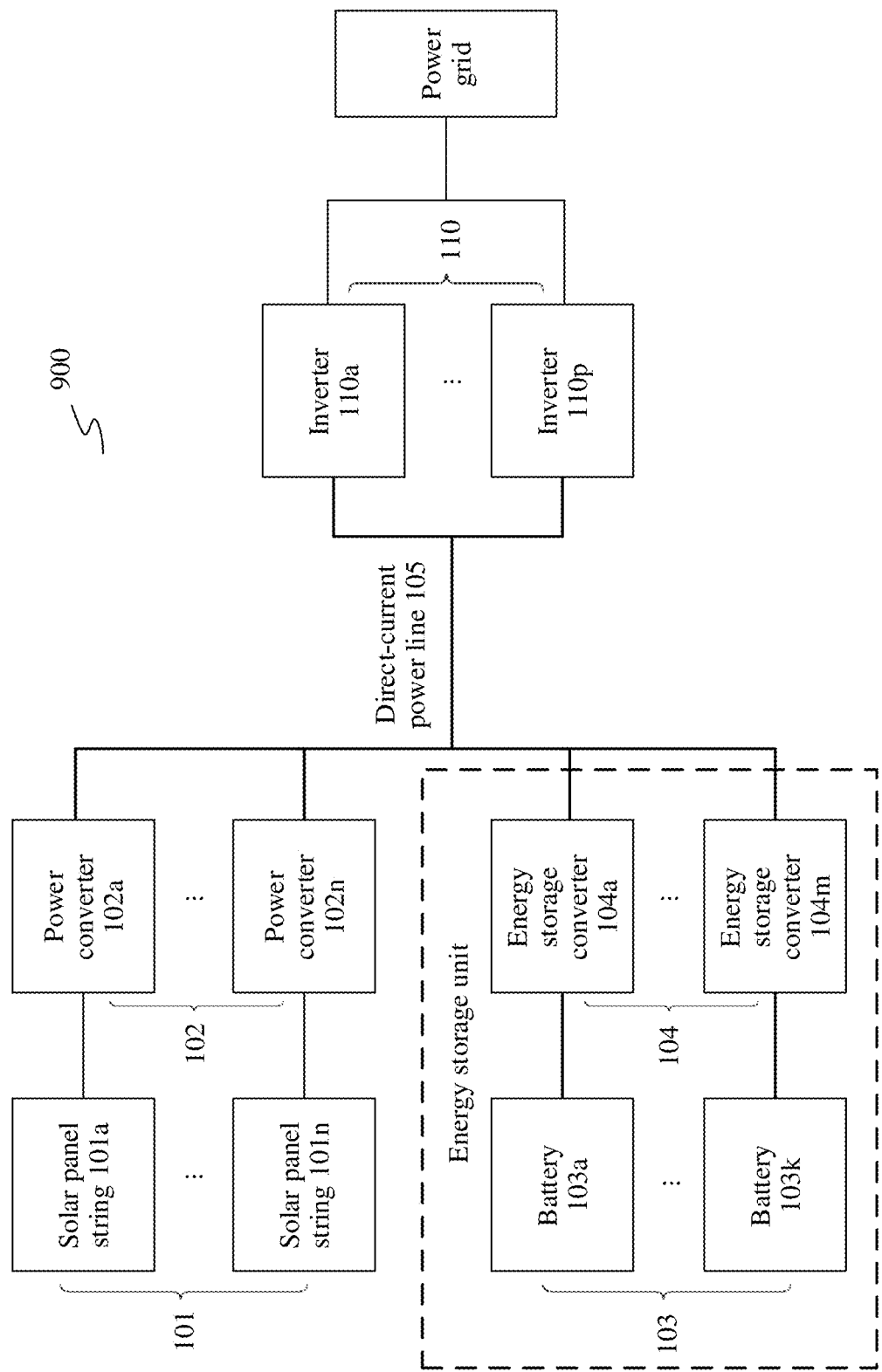
FIG. 1 is a schematic diagram of a photovoltaic power generation system according to an embodiment of this application.

The following further describes this application with reference to specific embodiments and accompanying drawings. It may be understood that the specific embodiments described herein are merely intended to explain this application, but not to limit this application. In addition, for ease of description, the accompanying drawings show only some rather than all structures or processes related to this application. It should be noted that, in this specification, reference numerals and letters in the following accompanying drawings represent similar items. Therefore, once an item is defined in an accompanying drawing, the item does not need to be further defined or interpreted in subsequent accompanying drawings.

In the descriptions of this application, it should be further noted that, unless otherwise specified and limited, the terms "setting", "connecting", and "connected" should be understood in a broad sense, for example, may be a fixed connection, a detachable connection, or an integrated connection; may be a mechanical connection or an electrical connection; may be directly connected, or may be indirectly connected by using an intermediate medium, or may be internally connected between two components. The specific meanings about the foregoing terms in the embodiments may be understood by a person of ordinary skill in the art based on specific circumstances.

It should be understood that although terms "first", "second", and the like may be used in this specification to describe features, the features should not be limited by these terms. These terms are used only for distinction and cannot be understood as an indication or implication of relative importance. For example, without departing from the scope of the example embodiments, the first feature may be referred to as a second feature, and similarly, the second feature may be referred to as a first feature.

Some example embodiments are described as processing or methods depicted as flowcharts. Although the flowchart describes the operations as sequential processing, many of these operations can be implemented in parallel, concurrently, or simultaneously. In addition, the sequence of the operations may be rearranged. The processing may be terminated when the operation is completed, but may further have additional blocks that are not included in the figures. The processing may correspond to a method, a function, a procedure, a subroutine, a subprogram, or the like. The following describes some terms appearing in the specification of this application.

Power converter: It is configured to perform voltage conversion on an input direct current. In some embodiments of this application, for example, the power converter may implement a direct current (DC)/direct current (DC) voltage boosting function, to convert a low-voltage direct current from a direct-current power supply (for example, a solar panel) into a high-voltage direct current for output. For example, in a photovoltaic power generation system, the power converter may convert a low-voltage direct current into a direct current voltage output that meets an input direct current voltage requirement of an inverter, to track a maximum power of a solar panel, so that the solar panel outputs the maximum power.

Energy storage converter: It has a bidirectional DC/DC conversion function. In some embodiments of this application, the energy storage converter may be connected to a direct-current power supply (for example, a battery) and implement a function of charging and discharging the direct-current power supply.

Inverter: It converts an input direct current into an alternating current through direct current (DC)/alternating current (AC) conversion for output.

Direct-current-side device: It is a device that is connected to a direct current input end of an inverter through a direct-current power line configured for direct current transmission, for example, a device that is connected to a direct current input end of an inverter through a direct-current power line and that provides the inverter with a direct current that meets a specific operating parameter requirement. Examples of the direct-current-side device include, but are not limited to, any one or more of a power converter, an energy storage converter, a battery cabinet, a direct current optimizer, a combiner box, and the like, or may include another direct-current-side device. The operating parameter includes, but is not limited to, any one or more of an output power, an output voltage, an output current, and the like, or may include another operating parameter.

To make the objectives, technical solutions, and advantages of this application clearer, the following further describes embodiments of this application in detail with reference to the accompanying drawings.

FIG. 1 shows an example of a power generation system according to some embodiments of this application.

As shown in FIG. 1, according to some embodiments of this application, a power generation system 900 is provided. The system 900 may include at least one power converter 102 (for example, n power converters 102a, . . . , and 102n) and at least one inverter 110 (for example, p inverters 110a, . . . , and 110p). An input end of the power converter 102 is connected to at least one solar panel string 101. Each solar panel string may include one or more solar panels. In an embodiment, each power converter may be connected in series to one solar panel string. For example, the power converter 102a may be connected in series to a solar panel string 101a. In an embodiment, each power converter may be connected in series to a plurality of solar panel strings. As a DC/DC converter with a voltage boosting function, the power converter 102 may convert a low-voltage direct current that is output by the solar panel string 101 into a direct current voltage output that meets an input direct current voltage requirement of the inverter. An output of the power converter 102 is connected to an input of the inverter 110 through a direct-current power line 105. After the direct current output by the solar panel string 101 passes through the power converter 102, the direct current is transmitted to the inverter 110 through the direct-current power line 105. The inverter 110 converts the received direct current into an alternating current for output, for example, output to a power grid. When there are a plurality of power converters 102 or inverters 110, output ends of the power converters may be connected in parallel, and input ends of the inverters may be connected in parallel. As shown in FIG. 1, output ends of the power converters 102a, . . . , and 102n are connected in parallel, and input ends of the inverters 110a, . . . , and 110p are connected in parallel. The parallel-connected output ends of the power converter 102a, . . . , and 102n are connected to the parallel-connected input ends of the inverter 110a, . . . , and 110p through the direct-current power line 105.

In an embodiment, the system 900 may further be connected in parallel to an energy storage unit shown by a dashed-line box in FIG. 1, to store excess electric energy of the solar panel string 101 in the power generation system 900, and supplement power supply at any time when necessary. The energy storage unit may include at least one energy storage converter 104 (for example, m energy storage converters 104a, . . . , and 104m) and at least one battery 103 (for example, k batteries 103a, . . . , and 103k) connected to the energy storage converter 104. Each energy storage converter 104 may be connected to one or more batteries. An example of the battery 103 may include, but is not limited to, a battery cabinet. In some embodiments of this application, the energy storage converter 104 may have a bidirectional DC/DC conversion function, to charge and discharge electric energy of the battery 103. When there are a plurality of energy storage converters 104, output ends of the plurality of energy storage converters 104 are also connected to the direct-current power line 105 in a parallel manner. For example, as shown in FIG. 1, the energy storage converters 104a, . . . , and 104m are connected in parallel and then connected to the direct-current power line 105.

In an embodiment, when a voltage of the battery 103 is sufficient, the battery 103 may not be connected to the inverter 110 through the energy storage converter 104, but instead, the battery 103 is directly connected to the inverter 110. In other words, the energy storage unit includes only the battery 103, and does not include the energy storage converter 104. In some embodiments of this application, an example of the battery 103 includes, but is not limited to, a battery cabinet. After connected in parallel to the power converter 102, the battery 103 is also connected to the input end of the inverter 110 through the direct-current power line. In some embodiments of this application, devices such as the power converter 102, the energy storage converter 104, or the battery 103 that are connected to the inverter through the direct-current power line 105 may be collectively referred to as a direct-current-side device.

According to an embodiment, a communication signal may be injected into the direct-current power line 105 that transmits electric energy between the direct-current-side device and the inverter 110, to implement information transmission and control between the direct-current-side device and the inverter 110. For example, the direct-current power line 105 that transmits electricity in the power generation system is also used as a signal transmission line for information transmission and control. In this way, it is unnecessary to dig a long trench or route a communication cable overhead additionally for communication between the direct-current-side device (for example, the power converter 102, the energy storage converter 104, or the battery 103) and the inverter 110 in the power generation system, thereby reducing costs of construction and communication cables.

Figure 2:
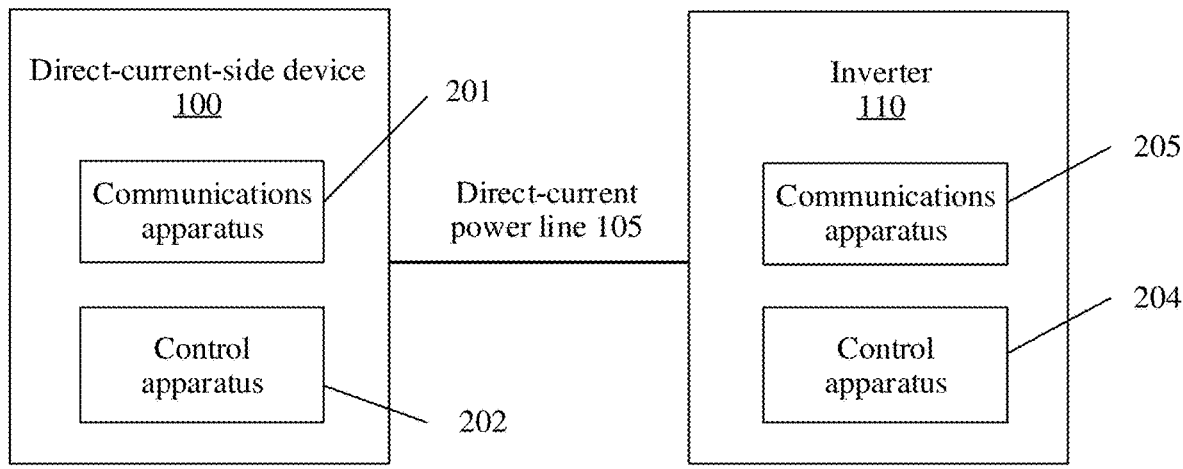
FIG. 2 is a schematic structural diagram of a direct-current-side device and an inverter according to an embodiment of this application.

FIG. 2 shows examples of internal structures of a direct-current-side device 100 and an inverter 110 according to an embodiment of this application. To implement communication between the direct-current-side device (for example, the power converter 102, the energy storage converter 104, or the battery 103) and the inverter 110, a communications apparatus may be disposed at each of the direct-current-side device 100 (for example, the power converter 102, the energy storage converter 104, or the battery 103) and the inverter 110 to receive and send information. Examples of the direct-current-side device 100 include, but are not limited to, the power converter 102, the energy storage converter 104, the battery 103, and the like.

As shown in FIG. 2, according to some embodiments of this application, the inverter 110 may include a control apparatus 204 and a communications apparatus 205. The control apparatus 204 is configured to control an operation of the inverter 110, for example, control the inverter 110 to convert a direct current that is input from the direct-current-side device into an alternating current for power supply. For example, the controller 204 generates a signal for requesting networking information required for networking between the inverter 110 and the direct-current-side device 100, a control signal for controlling an operating parameter of the direct-current-side device 100, or another control signal used to control networking with the direct-current-side device 100 and convert a direct current from the direct-current-side device 100 into an alternating current.

According to an embodiment, the communications apparatus 205 is coupled to the control apparatus 204, and configured to implement communication with the direct-current-side device 100. For example, the networking information request signal is sent from the inverter 110 to the direct-current-side device 100, or the requested networking information is received from the direct-current-side device 100, to complete networking. An example of the networking information includes, but is not limited to, any one or more of a physical address, a logical address, a serial number, a device identification code, and the like of the direct-current-side device. The communications apparatus 205 may send the control signal from the inverter 110 to the direct-current-side device 100, to control the operating parameter of the direct-current-side device 100. The operating parameter may include, but is not limited to, an output voltage, an output current, an output power, and the like of the direct-current-side device 100. A frequency band within which a frequency of the networking information request signal is located may be relatively low, to prevent crosstalk during networking. A frequency band within which a frequency of the control signal is located may be relatively high, for example, higher than the frequency band within which the networking information request signal is located, to implement high-speed information transmission.

In an embodiment, that one frequency band is higher than another frequency band may mean that a highest frequency and a lowest frequency of the one frequency band are respectively higher than a highest frequency and a lowest frequency of the another frequency band. To be specific, if a second frequency band is higher than a first frequency band, a highest frequency within the second frequency band is higher than a highest frequency within the first frequency band, and a lowest frequency within the second frequency band is higher than a lowest frequency within the first frequency band. Likewise, that one frequency band is lower than another frequency band may mean that a highest frequency and a lowest frequency of the one frequency band are respectively lower than a highest frequency and a lowest frequency of the another frequency band.

For example, according to some embodiments of this application, that the frequency band within which the frequency of the control signal is located is higher than the frequency band within which the networking information request signal is located may mean that a highest frequency of the frequency band within which the frequency of the control signal is located is higher than a highest frequency of the frequency band within which the networking information request signal is located, and a lowest frequency of the frequency band within which the frequency of the control signal is located is higher than a lowest frequency of the frequency band within which the networking information request signal is located. According to some embodiments of this application, the frequency band within which the frequency of the networking information request signal is located may not overlap the frequency band within which the frequency of the control signal is located. For example, the networking information request signal may be a low-frequency signal whose frequency is lower than 150 kHz, and the control signal may be a high-frequency signal whose frequency is higher than 200 kHz. In an embodiment, the frequency band within which the frequency of the networking information request signal is located may partially overlap the frequency band within which the frequency of the control signal is located. For example, the frequency of the networking information request signal may be within a low frequency band of 10 kHz to 200 kHz, and the frequency of the control signal may be within a high frequency band of 150 kHz to 6 GHz.

According to an embodiment, the communications apparatus 205 may further control a frequency of a to-be-sent signal (for example, the networking information request signal, the networking message, or the control signal) based on information related to the to-be-sent signal. The message related to the to-be-sent signal includes, but is not limited to, an amount of data of the signal, a delay of the signal, a distance over which the signal is to be sent, and the like. For example, when an amount of to-be-transmitted data is relatively small, a signal with a relatively low frequency may be used for transmission. When the amount of data is relatively large, a signal with a relatively high frequency may be used for transmission. For another example, when a delay requirement of a to-be-transmitted signal is relatively low (that is, a high delay), a signal with a relatively low frequency may be used for transmission. When the delay requirement is relatively high (that is, a low delay), a signal with a relatively high frequency may be used for transmission. For another example, when a communication distance of the to-be-sent signal is relatively short, a signal with a relatively high frequency may be used. When a communication distance is relatively long, a signal with a relatively low frequency is used for communication, to be transmitted over a longer distance. A manner of controlling, by the communications apparatus 205, the frequency of the to-be-sent signal based on the information related to the to-be-sent signal is described in detail below.

In an embodiment, the control signal sent by the inverter 110 to the direct-current-side device 100 through the direct-current power line by using the communications apparatus 205 may be classified into a general control signal and a special control signal. The two signals have different signal amplitudes. The general control signal is used to control the operating parameter of the direct-current-side device 100 in a normal case. In other words, in general cases, the general control signal is used for communication. The special control signal is used to control the operating parameter of the direct-current-side device 100 in a special case. For example, in a high voltage ride-through case or a low voltage ride-through case, an amplitude of the control signal is increased or decreased, so that the direct-current-side device 100 can quickly detect that the signal amplitude is abnormal, and quickly perform a predetermined action to quickly adjust the operating parameter of the direct-current-side device 100. For example, in a normal case, an amplitude of the general control signal may be, for example, 1 to 2 mV. If the high voltage ride-through case or the low voltage ride-through case occurs, the amplitude of the control signal is quickly changed, for example, to 10 mV. In an embodiment, a response may be made only to one of the high voltage ride-through case and the low voltage ride-through case by changing the amplitude of the control signal to be different from the amplitude of the general control signal. In an embodiment, both cases need responses. Then, amplitudes of control signals sent in the two cases may be set to be different from each other, so that the direct-current-side device 100 can quickly determine an action that needs to be performed based on a detected signal amplitude.

In an embodiment, the communications apparatus 205 may also be configured to send or receive other information.

The direct-current-side device 100 may include a communications apparatus 201 and a control apparatus 202. The communications apparatus 201 may be the same as or similar to the communications apparatus 205 in the inverter, and is configured to implement communication with the inverter 110.

For example, in an embodiment, the communications apparatus 201 may receive the networking information request signal from the inverter 110 in the power generation system, for example, filter out the networking information request signal from the direct-current power line, and obtain networking information request information through demodulation; and send the networking information to the inverter 110 based on the networking information request through the direct-current power line, for example, may send any one or more of the physical address, the logical address, the serial number, the device identification code, and the like of the direct-current-side device, to complete networking with the inverter 110. After the networking, the communications apparatus 201 receives the control signal or another signal from the inverter 110, or send other information to the inverter 110. For example, the communications apparatus 201 may send an operating information transmission signal to the inverter 110 through the direct-current power line. The operating information transmission signal may include, but is not limited to, operating status information, an operating log, alarm information, and the like of the direct-current-side device 100. According to some embodiments of this application, similar to the communications apparatus 205, the communications apparatus 201 may also control a frequency of a to-be-sent signal (for example, the networking information request signal, the networking message, or the control signal) based on information related to the to-be-sent signal, as described in detail below.

The control apparatus 202 of the direct-current-side device 100 is coupled to the communications apparatus 201, and configured to adjust the operating parameter of the direct-current-side device 100 according to an instruction of the inverter 110. The operating parameter may include, but is not limited to, the output voltage, the output current, the output power, or the like of the direct-current-side device 100. In an embodiment, the direct-current-side device 100 (for example, the power converter 102) may have two operating states: one is a power-limited output state, and the other is a normal power output state. Before the direct-current-side device 100 is networked with the inverter 110, the control apparatus 202 may control the direct-current-side device 100 to operate in the power-limited output state, that is, an operating state in which the output voltage, current, or power or the like of the direct-current-side device 100 is limited to be relatively low. Based on an indication that the direct-current-side device has been networked with the inverter, for example, the control signal received from the inverter 110 after the networking is completed, the control apparatus 202 controls the direct-current-side device 100 to enter a normal operating state. In the power-limited output state, the output voltage, current, or power or the like of the direct-current-side device 100 is limited, to avoid a problem such as an electric shock or line overload caused by a construction problem such as incorrect cable connection or cable damage, thereby improving safety of a power station.

By respectively adding the communications apparatuses 201 and 205 to the direct-current-side device 100 and the inverter 110, in the power generation system 900 shown in FIG. 1, the direct-current power line 105 between the direct-current-side device (for example, the power converter 102) and the inverter 110 may be configured to transmit direct current energy from the direct-current-side device to the inverter 110, and implement communication between the direct-current-side device 100 and the inverter 110. During communication, device identification and networking in the system may be first implemented between the direct-current-side device and the inverter 110 by using a signal with a relatively low frequency, to resolve a problem that the inverter cannot identify a direct-current-side device connected to the inverter due to crosstalk during high-frequency networking. Then, information transmission and control may be performed by switching to a relatively high frequency band. For example, networking may be first implemented by using a signal with a low frequency lower than 150 kHz, and then information transmission and control are performed by switching to a signal with a high frequency higher than 200 kHz. It should be noted that, the "lower than 150 kHz" and the "higher than 200 kHz" in this application are merely examples for description, and are not intended to limit this application. In an embodiment, signals with different frequencies may be selected based on different communication distances, weather conditions, transmission requirements, or the like.

In an embodiment, after the networking is implemented between the direct-current-side device 100 and the inverter 110 at a relatively low frequency, a high frequency may be switched to for communication in an adaptive manner. For example, a communication frequency is gradually increased, to finally reach a highest frequency that can be implemented under a current condition, for example, reach a highest transmit frequency while ensuring a specific bit error rate condition, and communicate at the highest frequency, to achieve a fastest transmission speed.

According to an embodiment, a frequency of a signal to be transmitted between the inverter 110 and the direct-current-side device 100 through the direct-current power line that transmits electric energy may be further adjusted or determined based on other information related to the to-be-sent signal. The related information may include, but is not limited to, an amount of data, a delay requirement, a transmission distance, and the like.

For example, according to an embodiment, when an amount of data to be transmitted between the inverter 110 and the direct-current-side device 100 is relatively small, a signal with a relatively low frequency may be used for transmission. When the amount of data is relatively large, a signal with a relatively high frequency may be used for transmission. For example, when a data amount range is lower than an amount of several k, for example, lower than 5 k, a signal with a relatively low frequency may be used to transmit data. The relatively low frequency may be within a same frequency band as the frequency of the networking information request signal, or may be the same as the frequency of the networking information request signal. When the data amount range is higher than the amount of several k, for example, higher than 5 k, a signal with a relatively high frequency may be used to transmit data.

According to another embodiment of this application, a frequency of a signal to be transmitted through the power line may be further related to a delay requirement. The delay refers to a time required for transmitting a data packet or the like from one end of a network to another end. When a delay requirement of a signal to be transmitted between the inverter 110 and the direct-current-side device 100 is relatively low (that is, a high delay), a signal with a relatively low frequency may be used for transmission. When the delay requirement is relatively high (that is, a low delay), a signal with a relatively high frequency may be used for transmission. For example, when a to-be-transmitted signal is a signal with a high delay, for example, a delay higher than 100 ms, a signal with a relatively low frequency may be used to transmit the signal to implement low-speed communication. The relatively low frequency may be within a same frequency band as the frequency of the networking information request signal, or may be the same as the frequency of the networking information request signal. When the to-be-transmitted signal requires a low delay, for example, the delay needs to be lower than 100 ms, a signal with a relatively high frequency may be used to transmit data, to implement high-speed communication.

According to another embodiment of this application, a communication distance between the inverter 110 and the direct-current-side device 100 may also be used as one of factors that affect a frequency of a to-be-sent signal. For example, for a relatively short communication distance, a signal with a relatively high frequency may be used, and for a relatively long communication distance, a signal with a relatively low frequency is used for communication, to be transmitted over a longer distance. For each communication distance, two communication frequency bands may coexist, to implement low-speed communication and high-speed communication respectively, for example, to implement low-frequency networking and high-frequency control between the inverter 110 and the direct-current-side device 100. For example, when the inverter 110 is relatively close to the direct-current-side device 100, the frequency of the low-frequency networking request signal transmitted between the two may be 250 kHz, and the frequency of the control signal may be 600 kHz. When the inverter 110 is relatively far away from the direct-current-side device 100, the frequency of the low-frequency networking request signal transmitted between the two may be 50 kHz, and the frequency of the control signal is 300 kHz.

According to an embodiment, the communications apparatuses 201 and 205 may be same apparatuses, and are respectively disposed at the direct-current-side device 100 and the inverter 110 to implement communication between the two. A structure of the communications apparatus may be shown in FIG. 6.

Figure 6:
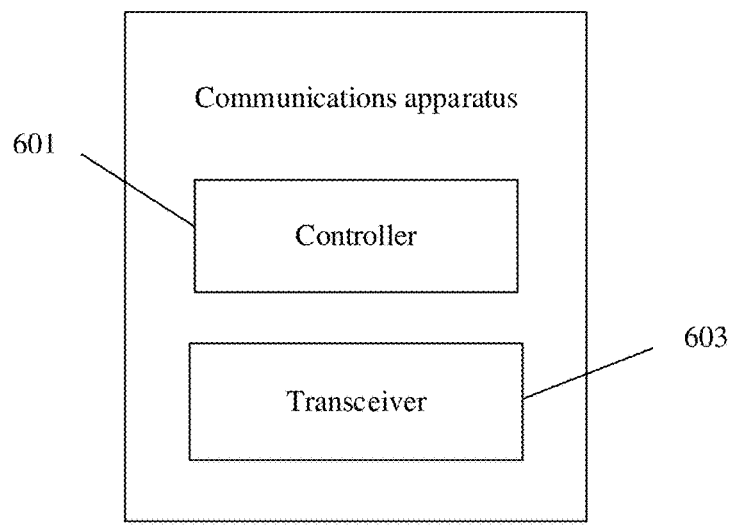
FIG. 6 is a schematic structural diagram of a communications apparatus according to an embodiment of this application.

As shown in FIG. 6, the communications apparatus 201/205 may include a controller 601 and a transceiver 603.

According to an embodiment, the transceiver 603 is configured to send a to-be-sent signal from a transmit end to a receive end through a power line. For example, according to some embodiments of this application, the transceiver 603 may include a coupler and a filter. The two may be integrated into one circuit, or may be spatially separated as a coupler and a filter. The coupler is configured to couple the to-be-sent signal to the power line, to transmit the to-be-sent signal through the power line. The filter is configured to filter out, from the power line, a signal received through the power line. The coupling herein may be performed in a plurality of manners, for example, magnetic ring coupling and capacitive coupling. Details are not described herein.

In an embodiment, the power line herein may be a direct-current power line, the transmit end may be the inverter 110 in the power generation system, and the receiving end is the direct-current-side device 100 connected to the inverter 110 through the direct-current power line. Alternatively, the transmit end may be the direct-current-side device 100 in the power generation system, and the receiving end is the inverter 110.

According to an embodiment, the controller 601 is configured to control a frequency of the to-be-sent signal based on information related to the to-be-sent signal. The information related to the to-be-sent signal may include, but is not limited to, information about networking between the transmit end and the receive end of the to-be-sent signal, an amount of data of the to-be-sent signal, a delay of the to-be-sent signal, a distance over which the to-be-sent signal is to be sent, and the like.

For example, the information related to the to-be-sent signal may be information about whether the transmit end has been networked with the receive end. Before the transmit end is networked with the receive end, the controller 601 may control the frequency of the to-be-sent signal to be within a first frequency band with a relatively low frequency. After the transmit end is networked with the receive end, the controller 601 may control the frequency of the to-be-sent signal to be within a second frequency band with a relatively high frequency. For example, if it is determined that the to-be-sent signal is the foregoing networking information request signal, the to-be-sent signal is controlled to be on the first frequency band, for example, the foregoing low frequency band lower than 150 kHz, to prevent crosstalk during the networking between the inverter and the direct-current-side device. If it is determined that the to-be-sent signal is the control signal used to control the operating parameter of the direct-current-side device or is the operating information transmission signal that carries at least one of operating status information, an operating log, and alarm information of the direct-current-side device, the to-be-sent signal is controlled to be on the second frequency band, for example, the foregoing high frequency band higher than 200 kHz.

In an embodiment, signals with different frequencies may be selected based on different communication distances, weather conditions, transmission requirements, or the like. For example, the controller 601 in the communications apparatus may be configured to change at least one of frequency values of the first frequency band and the second frequency band based on a length of the connected power line. For example, when a communication distance (that is, the distance over which the to-be-sent signal is to be sent) is relatively short, or in other words, the distance over which the to-be-sent signal is to be sent is relatively short, a signal with a relatively high frequency may be used. When a communication distance (that is, the distance over which the to-be-sent signal is to be sent) is relatively long, a signal with a relatively low frequency is used for communication, to be transmitted over a longer distance. For each communication distance, two communication frequency bands may coexist, to implement low-speed communication and high-speed communication respectively. For example, the communications apparatus is disposed in each of the inverter 110 and the direct-current-side device 100, to implement low-frequency networking and high-frequency control between the two. For example, when the inverter 110 is relatively close to the direct-current-side device 100, the frequency of the low-frequency networking request signal transmitted between the two may be 250 kHz, and the frequency of the control signal may be 600 kHz. When the inverter 110 is relatively far away from the direct-current-side device 100, the frequency of the low-frequency networking request signal transmitted between the two may be 50 kHz, and the frequency of the control signal is 300 kHz.

According to an embodiment, a frequency of a signal to be sent by the communications apparatus may be further adjusted or determined based on other information related to the to-be-sent signal. The related information may include, but is not limited to, an amount of data, a delay requirement, and the like.

For example, according to an embodiment of this application, the controller 601 in the communications apparatus may be configured to: when an amount of to-be-transmitted data is relatively small, control a signal with a relatively low frequency to be used for transmission, and when the amount of to-be-transmitted data is relatively large, control a signal with a relatively high frequency to be used for transmission. For example, when a data amount range is lower than an amount of several k, for example, lower than 5 k, a signal with a relatively low frequency may be used to transmit data. The relatively low frequency may be within a same frequency band as the frequency of the networking information request signal, or may be the same as the frequency of the networking information request signal. When the data amount range is higher than the amount of several k, for example, higher than 5 k, a signal with a relatively high frequency may be used to transmit data.

According to another embodiment of this application, the controller 601 in the communications apparatus may be configured to: when a delay requirement of a to-be-transmitted signal is relatively low (that is, a high delay), control a signal with a relatively low frequency to be used for transmission, and when the delay requirement is relatively high (that is, a low delay), control a signal with a relatively high frequency to be used for transmission. For example, when a to-be-transmitted signal is a signal with a high delay, for example, a delay higher than 100 ms, a signal with a relatively low frequency may be used to transmit the signal to implement low-speed communication. The relatively low frequency may be within a same frequency band as the frequency of the networking information request signal, or may be the same as the frequency of the networking information request signal. When the to-be-transmitted signal requires a low delay, for example, the delay needs to be lower than 100 ms, a signal with a relatively high frequency may be used to transmit data, to implement high-speed communication.

In an embodiment, the communications apparatus may be configured to adaptively adjust a frequency. In the power generation system, after networking is implemented by using a relatively low first frequency band, the communication frequency is gradually increased, to finally reach a highest frequency that can be implemented under a current condition, for example, reach a highest transmit frequency while ensuring a specific bit error rate condition, and use the frequency as a second frequency band for information transmission and control, to achieve a fastest transmission speed.

In addition, in the communications apparatus, a system for modulation to the first frequency band and a system for modulation to the second frequency band may be integrated or may be discrete. To be specific, the communications apparatus may include a separate integrated apparatus, and the separate integrated apparatus may generate signals located on two different frequency bands. The communications apparatus may alternatively include two subsystems or two sub-apparatuses. One of the two subsystems (or the two sub-apparatuses) is configured to generate a signal with a relatively low frequency (for example, lower than 150 kHz), and the other is configured to generate a signal with a relatively high frequency (for example, higher than 200 kHz).

In an embodiment, the controller 601 may further control an amplitude of the to-be-sent signal based on the information related to the to-be-sent signal. For example, one or more cases may be predetermined, and when the one or more predetermined cases occur, the to-be-sent signal is modulated to different amplitudes. For example, if it is determined that the communications apparatus is in a normal communication state, the amplitude of the to-be-sent signal is controlled to be a relatively low amplitude, for example, 1 to 2 mV. If as described above, a high-voltage ride-through case or a low-voltage ride-through case occurs, and a control signal needs to be sent, an amplitude of the control signal is controlled to be a relatively high amplitude, for example, 10 mV. In an embodiment, a response may be made only to one of the high voltage ride-through case and the low voltage ride-through case. In an embodiment, both cases need responses. Then, amplitudes of control signals sent in the two cases may be different from each other. According to an embodiment, in the communications apparatus, a system for modulation to a first amplitude and a system for modulation to a second amplitude may be integrated or may be discrete. To be specific, the communications apparatus may include a separate integrated apparatus, and the separate integrated apparatus may generate signals with two different amplitudes. The communications apparatus may alternatively include two subsystems or two sub-apparatuses that are respectively configured to generate signals with different amplitudes. One of the two subsystems (or the two sub-apparatuses) is configured to generate a signal with a relatively low amplitude (for example, lower than 2 mV), and the other is configured to generate a signal with a relatively high amplitude (for example, 10 mV).

In an embodiment, the controller 601 in this specification may include a modem, configured to modulate an original to-be-sent signal received from the control apparatus 204 of the inverter 110 or the control apparatus 202 of the direct-current-side device 100 to different frequency bands, to generate a to-be-sent signal. For example, the original to-be-sent signal may be modulated to the first frequency band or the second frequency band, or modulated to different amplitudes, to meet different communication requirements. A specific modulation/demodulation circuit may be implemented in various existing or future manners, for example, OFDM and FSK. Details are not described herein.

It should be noted that the communications apparatus described above with reference to FIG. 6 may be applied to direct-current power line carrier communication shown in FIG. 1 in this application, and may also be similarly applied to alternating-current power line carrier communication.

A specific method for communication between the direct-current-side device 100 and the inverter 110 is described in detail below with reference to FIG. 3 to FIG. 5.

Figure 3:
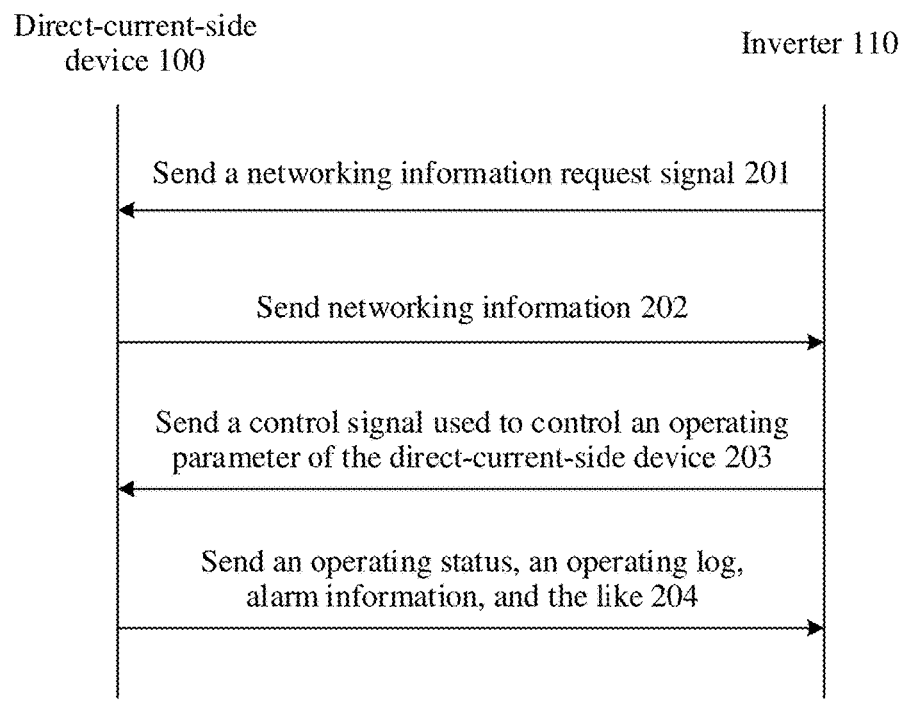
FIG. 3 is a schematic diagram of communication between a direct-current-side device and an inverter according to an embodiment of this application.

FIG. 3 shows an example of communication between the direct-current-side device 100 and the inverter 110 according to an embodiment of this application. As shown in FIG. 3, when the direct-current-side device 100 and the inverter 110 communicate with each other by using the direct-current power line that transmits electricity in the power generation system as a direct-current bus, first, the inverter 110 generates a networking information request signal, for example, may send the networking information request signal to the direct-current-side device through the direct-current bus by using the communications apparatus 205 (201). The networking information request signal is used to request networking information required for networking between the inverter 110 and the direct-current-side device 100, for example, request any one or more of a physical address, a logical address, a serial number, a device identification code, and the like of the direct-current-side device. For example, the communications apparatus 205 may modulate a frequency of the networking information request signal to a first frequency band, for example, the foregoing low frequency band lower than 150 kHz, and then couple the modulated networking information request signal to the direct-current power line, to transmit the modulated networking information request signal to the direct-current-side device 100 through the direct-current power line.

The direct-current-side device 100 filters out the networking information request signal from the direct-current power line, and obtains networking information request information through demodulation. Based on the networking information request, the direct-current-side device 100 may send the networking information to the inverter 110 by using the communications apparatus 201 (202). For example, if the networking information request signal is a request for obtaining the device identification code of the direct-current-side device, the networking information may be the device identification code of the direct-current-side device. A signal that is sent by the direct-current-side device 100 and that carries the networking information may be modulated to a frequency band that is the same as the frequency band within which the received networking information request signal is located.

After receiving the networking information sent by the direct-current-side device 100, for example, filtering out the signal carrying the networking information from the direct-current power line, and obtaining the networking information through demodulation, the inverter 110 may perform networking with the direct-current-side device based on the received networking information, to facilitate subsequent information transmission and control. Then, the inverter 110 may generate a control signal whose frequency is higher than a frequency of the networking information request signal, for example, modulate the frequency of the control signal to a second frequency band higher than the first frequency band, for example, the foregoing high frequency band higher than 200 kHz, and then couple the control signal to the direct-current power line to send the control signal to the direct-current-side device 100, where the control signal is used to control an operating parameter of the direct-current-side device (203). After receiving the control signal, the direct-current-side device 100 may adjust the operating parameter based on the received control signal, for example, adjust any one or more of an output power, an output voltage, an output current, and the like based on a requirement in the control signal.

In addition to receiving the control signal of the inverter to adjust the operating parameter of the direct-current-side device 100, the direct-current-side device 100 may further send an operating information transmission signal to the inverter through the direct-current power line in a similar manner (204). The operating information transmission signal may carry, for example, at least one of operating status information, an operating log, and alarm information of the direct-current-side device. That the direct-current-side device 100 sends an operating information transmission signal to the inverter (204) may be: The inverter first sends an operating information request to the direct-current-side device 100, and then the direct-current-side device 100 sends the operating information transmission signal based on the request received from the inverter 110. Alternatively, the direct-current-side device 100 may actively send the operating information transmission signal based on a requirement, for example, send the operating information transmission signal to the inverter 100 at a specified time. A frequency of the operating information transmission signal may be the same or belong to the same frequency band as the frequency of the control signal. For example, both are signals whose frequencies are higher than the frequency of the networking information request signal.

By implementing system networking at a relatively low frequency, and then switching to a signal with a relatively high frequency for information transmission and control, a problem that when a high-frequency signal is used for networking between an inverter and a power converter, the high-frequency signal easily causes crosstalk on an adjacent direct-current bus, and consequently, the inverter cannot identify power converters connected to the inverter can be effectively avoided. In an embodiment, after the networking is implemented at a relatively low frequency, a high frequency may be switched to for communication in an adaptive manner. For example, a communication frequency is gradually increased, to finally reach a highest frequency that can be implemented under a current condition, for example, reach a highest transmit frequency while ensuring a specific bit error rate condition, and communicate at the highest frequency, to achieve a fastest transmission speed.

The control signal sent by the inverter 110 to the direct-current-side device 100 through the direct-current power line may be classified into a general control signal and a special control signal. The two signals have different signal amplitudes. The general control signal is used to control the operating parameter of the direct-current-side device in a normal case. In other words, in general cases, the general control signal is used for communication. The special control signal is used to control the operating parameter of the direct-current-side device in a special case. For example, in a high voltage ride-through case or a low voltage ride-through case, an amplitude of the control signal is increased or decreased, so that the direct-current-side device quickly detects that the signal amplitude is abnormal, and can quickly perform a predetermined action to quickly adjust the operating parameter of the direct-current-side device. For example, in a normal case, an amplitude of the general control signal may be, for example, 1 to 2 mV. If the high voltage ride-through case or the low voltage ride-through case occurs, the special control signal needs to be sent. An amplitude of the special control signal may be, for example, 10 mV.

In an embodiment, the direct-current-side device 100 (for example, the power converter 102) may have two operating states: one is a power-limited output state, and the other is a normal power output state. Before the direct-current-side device 100 is networked with the inverter 110, the direct-current-side device 100 may operate in the power-limited output state. Based on an indication that the direct-current-side device has been networked with the inverter, for example, once a control signal from the inverter 110 is received, the direct-current-side device 100 may enter a normal operating state. In the power-limited output state, the output voltage, current, or power or the like of the direct-current-side device 100 is limited, to avoid a problem such as an electric shock or line overload caused by a construction problem such as incorrect cable connection or cable damage or accidental contact, thereby improving safety of a power station.

Figure 4:
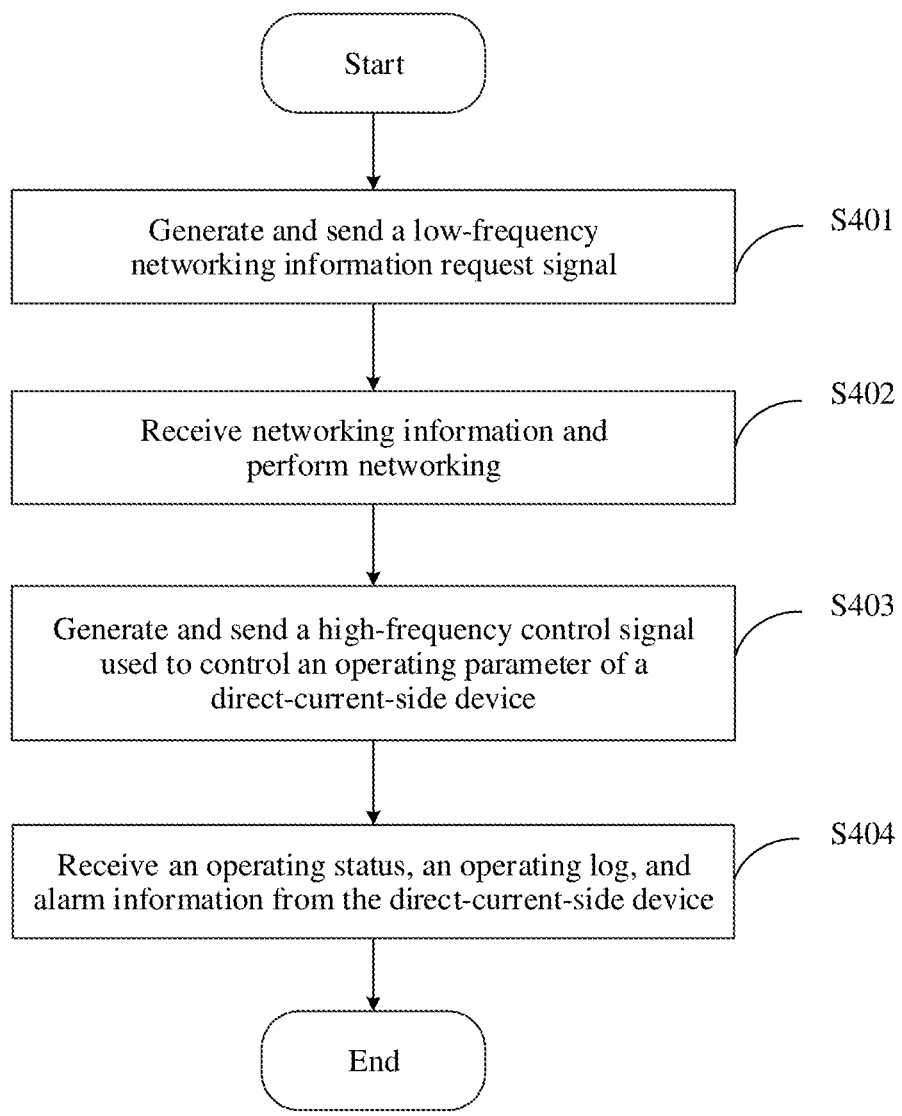
FIG. 4 is a flowchart of a method for an inverter in a power generation system according to an embodiment of this application.
Figure 5:
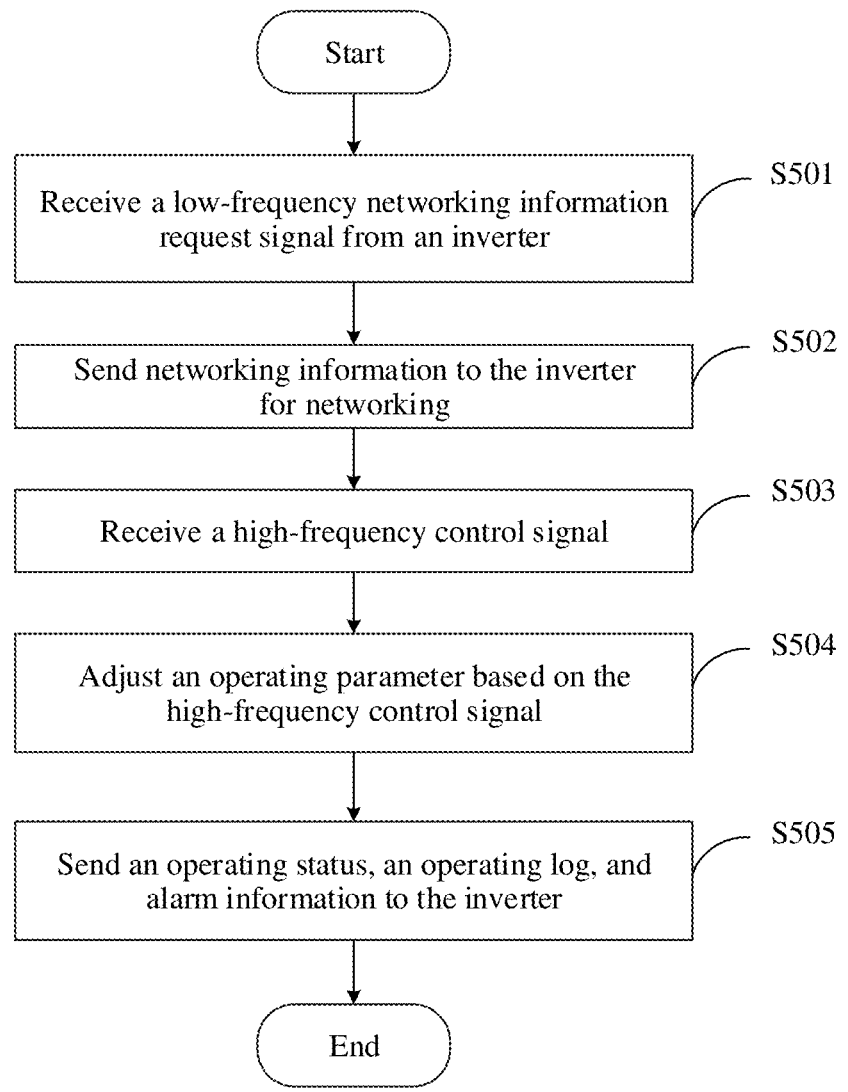
FIG. 5 is a flowchart of a method for a direct-current-side device in a power generation system according to an embodiment of this application.

In a communication process, processing performed by the inverter 110 and the direct-current-side device 100 may be shown in FIG. 4 and FIG. 5 respectively.

FIG. 4 is a flowchart of a method for the inverter 110 in the power generation system according to an embodiment of this application. First, block S401: The inverter 110 generates a networking information request signal, and sends the networking information request signal to the direct-current-side device 100 in the power generation system through a direct-current bus. A frequency of the networking information request signal may be modulated to a first frequency band, for example, the foregoing low frequency band lower than 150 kHz. The networking information request signal is used to request networking information required for networking between the inverter and the direct-current-side device, for example, any one or more of a physical address, a logical address, a serial number, and a device identification code of the direct-current-side device. Then, block S402: Receive networking information from the direct-current-side device 100 through the direct-current bus, and perform networking with the direct-current-side device based on the networking information. Then, block S403: Generate a control signal, and send the control signal to the direct-current-side device 100 through the direct-current bus. A frequency of the control signal may be set within a second frequency band higher than the first frequency band, for example, the foregoing high frequency band higher than 200 kHz, to implement high-speed communication. The control signal may be used to control an operating parameter of the direct-current-side device 100. In an embodiment, the inverter 110 may further receive an operating information transmission signal from the direct-current-side device through the direct-current bus, that is, block S404. The operating information transmission signal carries at least one of operating status information, an operating log, and alarm information of the direct-current-side device 100. The operating information transmission signal may be actively sent by the direct-current-side device 100, or may be received from the direct-current-side device 100 after an operating information request is sent to the direct-current-side device 100.

FIG. 5 is a flowchart of a method for the direct-current-side device 100 in the power generation system according to an embodiment of this application. As shown in FIG. 5, first, block S501: Receive a networking information request signal from the inverter 110 through a direct-current bus. A frequency of the networking information request signal is within a first frequency band, for example, the foregoing low frequency band lower than 150 kHz. Then, block S502: Send networking information to the inverter 110 based on the received networking information request signal through the direct-current bus. In this embodiment, a frequency of a signal carrying the networking information may also be set within the first frequency band. In an embodiment, the frequency of the signal carrying the networking information may be different from the frequency of the networking information request signal. Then, block S503: Receive a control signal from the inverter. A frequency of the control signal may be within a second frequency band, for example, the foregoing high frequency band higher than 200 kHz. Then, block S504: The control apparatus in the direct-current-side device 100 may adjust an operating parameter, for example, an output voltage, an output current, or an output power, of the direct-current-side device based on the received control signal. In an embodiment, the direct-current-side device 100 may further send, actively or based on a request of the inverter 110, an operating information transmission signal that carries at least one of operating status information, an operating log, and alarm information of the direct-current-side device 100 to the inverter 110 through the direct-current bus, that is, block S505. In this embodiment, a frequency of the operating information transmission signal may be within the second frequency band. In an embodiment, the operating information transmission signal may alternatively be modulated to another frequency band.

The foregoing communication content is merely an example for description. In an embodiment, the inverter 110 and the direct-current-side device 100 may perform communication that includes various types of information.

In some cases, some or all of the embodiments disclosed in FIG. 3 to FIG. 5 may be implemented by hardware, firmware, software, or any combination thereof. The disclosed embodiments may be further implemented as instructions carried or stored on one or more transitory or non-transitory machine-readable (for example, computer-readable) storage media. The instructions may be read and executed by one or more processors in a machine, to enable the machine to perform one or more features in the methods described above with reference to FIG. 3 to FIG. 5. The machine-readable medium may include any mechanism for storing or transmitting information in a machine-readable (for example, a computer-readable) form, but is not limited to a floppy disk, an optical disc, a compact disc read-only memory (CD-ROMs), a magnetic disk, a read-only memory (ROM), a random access memory (RAM), an erasable programmable read only memory (EPROM), an electrically erasable programmable read only memory (EEPROM), a magnetic card or an optical card, a flash memory, or a tangible machine-readable memory that transmits information through a network by using a signal (for example, a carrier, an infrared signal, or a digital signal) that is propagated through electricity, light, sound, or another form. Therefore, the machine-readable medium includes any type of machine-readable medium suitable for storing or transmitting an electronic instruction or information in a machine-readable (for example, a computer-readable) form.

Therefore, according to an embodiment of this application, a machine-readable medium may be provided. The machine-readable medium stores an instruction. When the instruction is run on a machine, the machine performs some or all of the methods described above with reference to FIG. 3 to FIG. 5.

The methods disclosed in the foregoing embodiments of this application may be applied to a processor, or implemented by a processor. The processor may be an integrated circuit chip and has a signal processing capability. In an embodiment, operations in the foregoing methods can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component, and may implement or execute various methods, blocks, and logical block diagrams disclosed in the embodiments of this application. The general purpose processor may be a microprocessor, or the processor may be any conventional processor or the like. Operations of the methods disclosed with reference to the embodiments of this application may be directly executed and accomplished by means of a hardware decoding processor, or may be executed and accomplished by using a combination of hardware and software modules in a decoding processor. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the operations in the foregoing methods in combination with hardware of the processor.

It may be understood that the embodiments described in this specification may be implemented by hardware, software, firmware, middleware, microcode or a combination thereof. Hardware implementations may include at least one of the following implementations, for example but not limited to, one or more application-specific integrated circuits (ASICs), electronic circuits, digital signal processors (DSPs), programmable logic devices (PLDs), field programmable gate arrays (FPGAs), general purpose processors, dedicated processors, microprocessors, other electronic units configured to perform the functions described in this application, or a combination thereof.

For software implementation, the technology described in this specification may be implemented by using modules for executing the functions (for example, a process or a function) described in this specification. Software code may be stored in the memory and executed by the processor. The memory may be implemented in the processor or outside the processor.

Therefore, according to another embodiment of this application, a system may be provided, including a processor and a memory. The memory stores an instruction, and the processor is configured to read the instruction stored in the memory, to perform some or all of the methods described above with reference to FIG. 3 to FIG. 5.

Figure 7:
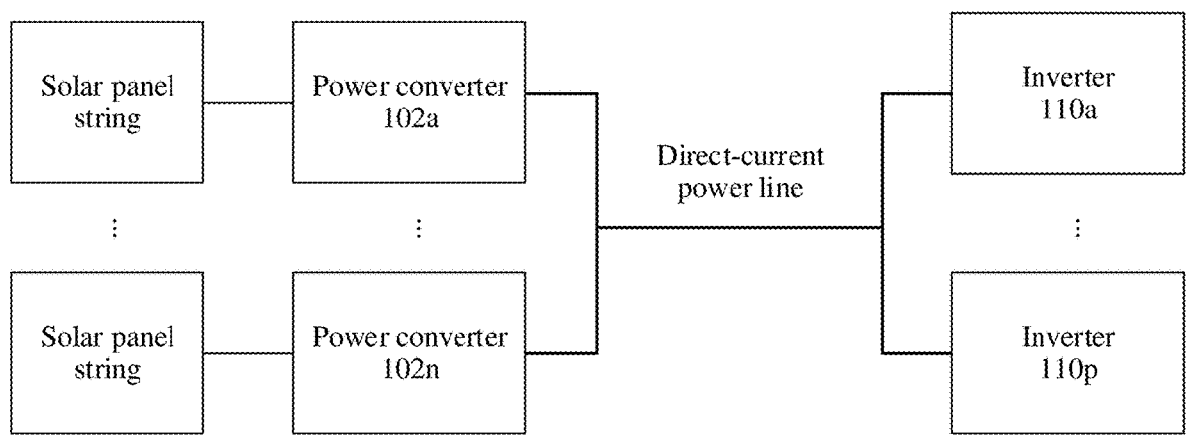
FIG. 7 is a schematic diagram of communication between only a power converter and an inverter according to an embodiment of this application.
Figure 8:
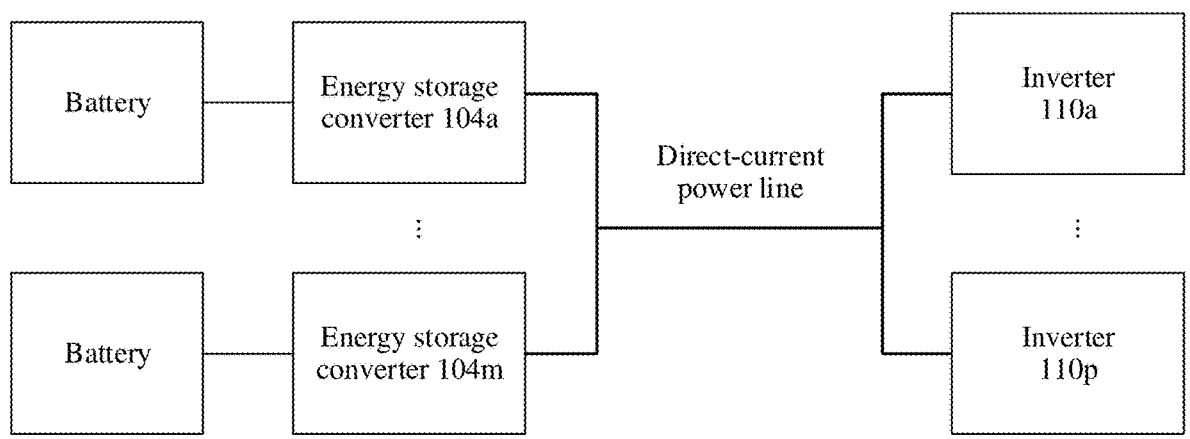
FIG. 8 is a schematic diagram of communication between only an energy storage converter and an inverter according to an embodiment of this application.
Figure 9:
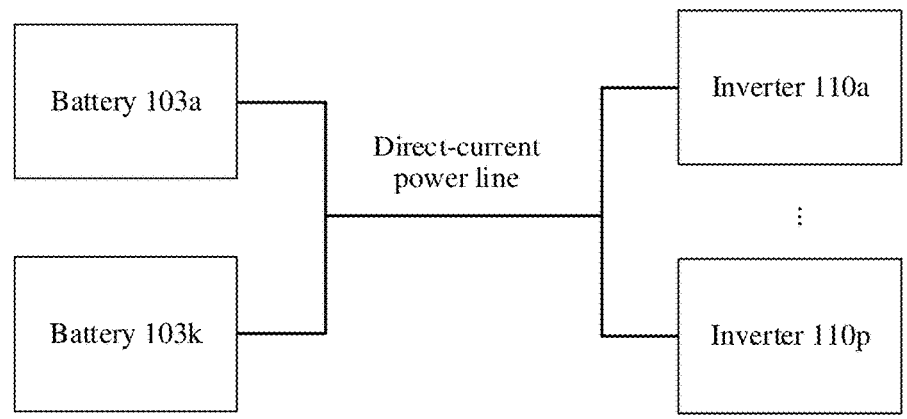
FIG. 9 is a schematic diagram of communication between only a battery cabinet and an inverter according to an embodiment of this application.

In the power generation system in this application, the direct-current-side device 100 may be any one or more of a power converter, an energy storage converter, a battery cabinet, a direct current optimizer, a combiner box, and the like. FIG. 7 to FIG. 9 respectively show schematic diagrams of communicative connections between an inverter and different examples of the direct-current-side device 100. FIG. 7 is a schematic diagram of communication between only a power converter and an inverter according to an embodiment of this application. FIG. 8 is a schematic diagram of communication between only an energy storage converter and an inverter according to an embodiment of this application. FIG. 9 is a schematic diagram of communication between only a battery cabinet and an inverter according to an embodiment of this application. Other direct-current-side devices such as the direct current optimizer and the combiner box may also communicate with the inverter in a similar manner.

In a system shown in FIG. 7, at least one power converter 102 is connected to at least one inverter 110, and an input end of the power converter 102 is connected to at least one solar panel string. When there are a plurality of power converters 102 and inverters 110, outputs of the power converters 102 are connected in parallel, inputs of the inverters 110 are connected in parallel, and the outputs of the power converters 102 are connected to the inputs of the inverter 110 through a direct-current bus constituted by a direct-current power line. Communication apparatuses in the power converter 102 and the inverter 110 couple the foregoing low-frequency signals to the direct-current bus, to implement system networking at a relatively low frequency; and then switch to a relatively high frequency, and couple signals to the direct-current bus, to implement high-speed information transmission and control between the power converter 102 and the inverter 110.

In a system shown in FIG. 8, at least one energy storage converter 104 is connected to at least one inverter 110, and an input end of the energy storage converter 104 is connected to a battery to implement battery charging and discharging. When there are a plurality of energy storage converters 104 and inverters 110, outputs of the energy storage converter 104 are connected in parallel, inputs of the inverters 110 are connected in parallel, the outputs of the energy storage converter 104 are connected to the inputs of the inverter 110 through a direct-current bus constituted by a direct-current power line. Communication apparatuses in the energy storage converter 104 and the inverter 110 couple low-frequency or high-frequency signals to the direct-current bus, to implement information transmission and control between the energy storage converter 104 and the inverter 110.

FIG. 9 shows a system in which the battery 103 is directly connected to the inverter 110 without the energy storage converter. For example, the battery 103 may be in a form of a battery cabinet. The battery cabinet may include a battery pack, a battery control apparatus, and a communications apparatus. There may be one or more batteries 103 and one or more inverters 110. When there are a plurality of batteries 103 and inverters 110, outputs of the batteries 103 are connected in parallel, inputs of the inverters 110 are connected in parallel, and the outputs of the battery cabinets and the inputs of the inverters 110 are connected through a direct-current bus constituted by a direct-current power line. Communication apparatus in the battery cabinet and the inverter 110 couple low-frequency or high-frequency signals to the direct-current bus, so that the battery control apparatus in the battery cabinet may communicate with the inverter, to implement information transmission and control between the inverter 110 and the battery cabinet.

The systems shown in FIG. 8 and FIG. 9 may be applied to various power generation systems, and are not limited to a photovoltaic power generation system. FIG. 7 to FIG. 9 show cases in which one type of direct-current-side device communicates with an inverter. In an embodiment, the system may alternatively include a plurality of types of direct-current-side devices that separately communicate with the inverter, for example, the system shown in FIG. 1.

In the embodiments of this application, a signal is injected into a power cable between the direct-current-side device and the inverter to implement communication, so that no additional signal cable is required. This reduces a debugging time and construction and cable costs, simplifies deployment, and achieves higher safety. A signal with a relatively low frequency is first used for networking, and then a signal with a relatively high frequency is used for high-speed communication, so that a problem of crosstalk during the networking between the inverter and the direct-current-side device is effectively avoided.

The foregoing describes the embodiments of this application in detail with reference to the accompanying drawings. However, use of the technical solutions of this application is not limited to the applications mentioned in the embodiments of this application, and various structures and variations may be readily implemented with reference to the technical solutions of this application, to achieve various beneficial effects mentioned in this specification. Various variations made by a person of ordinary skill in the art without departing from the essence of this application shall fall within the scope of this application.

What is claimed is:

1. An inverter in a power generation system, comprising:
   a control apparatus configured to control the inverter to convert a direct current (DC) input from a DC-side device into an alternating current (AC) for power supply; and
   a communications apparatus coupled to the control apparatus, and configured to:
   send a networking information request signal to the DC-side device, through a DC power line that transmits a direct current in the power generation system, to request networking information required for networking between the inverter and the DC-side device, wherein a frequency of the networking information request signal is within a first frequency band;
   receive the networking information from the DC-side device through the DC power line; and
   send a control signal to the DC-side device through the DC power line to control an operating parameter of the DC-side device, wherein a frequency of the control signal is within a second frequency band that is higher than the first frequency band.

2. The inverter according to claim 1, wherein the networking information comprises at least one of: a physical address, a logical address, a serial number, or a device identification code of the DC-side device; and wherein a frequency of the received networking information is within the first frequency band.

3. The inverter according to claim 1, wherein the communications apparatus is further configured to:
   receive an operating information transmission signal from the DC-side device through the DC power line; wherein the operating information transmission signal carries at least one of: operating status information, an operating log, or alarm information of the DC-side device; and wherein a frequency of the received operating information transmission signal is within the second frequency band.

4. The inverter according to claim 1, wherein:
   the control signal comprises a general control signal and a special control signal, wherein an amplitude of the special control signal is different from an amplitude of the general control signal;
   the general control signal is used to control the operating parameter of the DC-side device in a normal case; and the special control signal is used to control the operating parameter of the DC-side device in a special case; and
   the special case comprises a high voltage ride-through case or a low voltage ride-through case.

5. The inverter according to claim 1, wherein:
   the DC-side device comprises at least one of: a power converter, an energy storage converter, or a battery cabinet; and
   the operating parameter comprises at least one of an output power, an output voltage, or an output current of the DC-side device.

6. A method performed by an inverter in a power generation system, comprising:
   generating a networking information request signal;
   sending the networking information request signal to a direct-current-side (DC-side) device in the power generation system, through a DC power line that is used to transmit electric energy in the power generation system, to request networking information required for networking between the inverter and the DC-side device, wherein a frequency of the networking information request signal is within a first frequency band;
   receiving the networking information from the DC-side device through the DC power line;
   performing networking with the DC-side device based on the networking information;
   generating a control signal; and
   sending the control signal to the DC-side device through the DC power line to control an operating parameter of the DC-side device, wherein a frequency of the control signal is within a second frequency band that is higher than the first frequency band.

7. The method according to claim 6, wherein a frequency of the received networking information is within the first frequency band, and the networking information comprises at least one of: a physical address, a logical address, a serial number, or a device identification code of the DC-side device.

8. The method according to claim 6, further comprising:
   receiving an operating information transmission signal from the DC-side device through the DC power line, wherein the operating information transmission signal carries at least one of: operating status information, an operating log, or alarm information of the DC-side device; and wherein a frequency of the received operating information transmission signal is within the second frequency band.

9. The method according to claim 6, wherein:
the control signal comprises a general control signal and a special control signal, wherein an amplitude of the special control signal is different from an amplitude of the general control signal;
the general control signal is used to control the operating parameter of the DC-side device in a normal case; and the special control signal is used to control the operating parameter of the DC-side device in a special case; and
the special case comprises a high voltage ride-through case or a low voltage ride-through case.

10. The method according to claim 6, wherein:
the operating parameter comprises at least one of: an output power, an output voltage, or an output current of the DC-side device.

11. A direct-current-side device in a power generation system, comprising:
a communications apparatus configured to:
receive a networking information request signal from an inverter in the power generation system, through a direct-current (DC) power line that transmits electric energy in the power generation system, to request networking information required for networking between the inverter and the DC-side device, wherein a frequency of the networking information request signal is within a first frequency band;
send the networking information to the inverter through the DC power line; and
receive a control signal from the inverter to control an operating parameter of the DC-side device, wherein a frequency of the control signal is within a second frequency band that is higher than the second frequency band; and
a control apparatus coupled to the communications apparatus and configured to adjust the operating parameter of the DC-side device based on the received control signal.

12. The direct-current-side device according to claim 11, wherein a frequency of the networking information is within the first frequency band, and the networking information comprises at least one of: a physical address, a logical address, a serial number, or a device identification code of the DC-side device.

13. The direct-current-side device according to claim 11, wherein the communications apparatus is further configured to send an operating information transmission signal to the inverter through the DC power line, wherein the operating information transmission signal carries at least one of: operating status information, an operating log, or alarm information of the DC-side device; and wherein a frequency of the operating information transmission signal is within the second frequency band.

14. The direct-current-side device according to claim 11, wherein the control apparatus is further configured to control, based on an indication that the DC-side device has been networked with the inverter, the DC-side device to switch from a power-limited output state with a limited output power to a normal operating state.

15. The direct-current-side device according to claim 11, wherein
the DC-side device comprises at least one of: a power converter, an energy storage converter, or a battery cabinet; and
the operating parameter comprises at least one of: an output power, an output voltage, or an output current of the DC-side device.

16. A method performed by a direct-current-side device in a power generation system, comprising:
receiving a networking information request signal from an inverter, through a direct-current (DC) power line that transmits electric energy in the power generation system, to request networking information required for networking between the inverter and the DC-side device, wherein a frequency of the networking information request signal is within a first frequency band;
sending the networking information to the inverter through the DC power line; and
receiving a control signal from the inverter, through the DC power line, to control an operating parameter of the DC-side device, wherein a frequency of the control signal is within a second frequency band that is higher than the first frequency band.

17. The method according to claim 16, wherein a frequency of the networking information is within the first frequency band, and the networking information comprises at least one of: a physical address, a logical address, a serial number, or a device identification code of the DC-side device.

18. The method according to claim 16, further comprising:
sending an operating information transmission signal to the inverter through the DC power line, wherein the operating information transmission signal carries at least one of: operating status information, an operating log, or alarm information of the DC-side device; and wherein a frequency of the operating information transmission signal is within the second frequency band.

19. The method according to claim 16, wherein the DC-side device is switched from a power-limited output state with a limited output power to a normal operating state based on the received control signal.

20. The method according to claim 16, wherein the DC-side device comprises at least one of: a power converter, an energy storage converter, and a battery cabinet; and wherein the operating parameter comprises at least one of: an output power, an output voltage, or an output current of the DC-side device.

21. A power generation system, comprising:
a direct-current-side (DC-side) device; and
an inverter configured to generate a networking information request signal, and send the networking information request signal to the DC-side device, through a DC power line, to request networking information required for networking between the inverter and the DC-side device, wherein a frequency of the networking information request signal is within a first frequency band;
wherein the DC-side device is configured to send the networking information to the inverter through the DC power line based on the received networking information request signal; and
wherein the inverter is configured to
receive the networking information through the DC power line,
perform networking with the DC-side device based on the networking information,
generate a control signal, and
send the control signal to the DC-side device, through the DC power line, to control an operating parameter of the DC-side device, wherein a frequency of the control signal is within a second frequency band that is higher than the first frequency band.

22. A communications apparatus using a power line to communicate, comprising:

a transceiver configured to send a to-be-sent signal from a transmit end to a receive end through the power line; and a controller configured to:
- control a frequency of the to-be-sent signal based on information related to the to-be-sent signal, wherein the information related to the to-be-sent signal comprises at least one of: information about whether the transmit end related to the to-be-sent signal has been networked with the receive end related to the to-be-sent signal, an amount of data of the to-be-sent signal, a delay of the to-be-sent signal, or a distance over which the to-be-sent signal is to be sent, and
- control, based on a data amount range within which the amount of data of the to-be-sent signal is located, a frequency band within which the frequency of the to-be-sent signal is located, wherein a smaller data amount range indicates a lower frequency band.

23. The communications apparatus according to claim 22, wherein the controller is further configured to:
control the frequency of the to-be-sent signal to be within a first frequency band when the transmit end is not networked with the receive end; and
control the frequency of the to-be-sent signal to be within a second frequency band when the transmit end has been networked with the receive end; wherein
the first frequency band is lower than the second frequency band.

24. The communications apparatus according to claim 23, wherein:
when the frequency of the to-be-sent signal is within the first frequency band, the to-be-sent signal comprises a networking information request signal, wherein the networking information request signal is used to request networking information required for networking between an inverter and a DC-side device, and
when the frequency of the to-be-sent signal is within the second frequency band, the to-be-sent signal comprises a control signal or an operating information transmission signal, wherein the control signal is used to control a parameter of the DC-side device, and the operating information transmission signal carries at least one of: operating status information, an operating log, or alarm information of the DC-side device.

25. The communications apparatus according to claim 24, wherein the networking information comprises at least one of: a physical address, a logical address, a serial number, or a device identification code of the DC-side device.

26. The communications apparatus according to claim 22, wherein:
the transmit end is a part of an inverter in a power generation system;
the receive end is a part of a DC-side device in the power generation system; and
the power line is a DC power line.

27. The communications apparatus according to claim 22, wherein the controller is further configured to:
control, based on a delay range within which the delay of the to-be-sent signal is located, a frequency band within which the frequency of the to-be-sent signal is located, wherein
a lower delay range indicates a higher frequency band.

28. The communications apparatus according to claim 22, wherein the controller is further configured to:
control, based on a distance range within which the distance over which the to-be-sent signal is to be sent is located, a frequency band within which the frequency of the to-be-sent signal is located, wherein
a longer distance range indicates a lower frequency band.

29. The communications apparatus according to claim 22, wherein the controller is further configured to:
control an amplitude of the to-be-sent signal based on whether at least one of the transmit end or and the receive end is in a predetermined case,
if at least one of the transmit end or the receive end is in the predetermined case, control the amplitude of the to-be-sent signal to be a first amplitude, and
if neither the transmit end nor the receive end is in the predetermined case, control the amplitude of the to-be-sent signal to be a second amplitude that is different from the first amplitude.

30. The communications apparatus according to claim 29, wherein the predetermined case comprises a high voltage ride-through case or a low voltage ride-through case.

* * * * *